United States Patent Office 3,309,249
Patented Mar. 14, 1967

3,309,249
THERMITE-RESIN BINDER SOLID FUEL
COMPOSITION
Paul L. Allen, Santa Clara, Calif., assignor, by mesne assignments, to the United States of America as represented by the Secretary of the Navy
No Drawing. Filed Mar. 15, 1965, Ser. No. 440,998
6 Claims. (Cl. 149—19)

The invention relates to a solid fuel composition. More particularly it relates to solid fuel compositions having a high regression rate for use in the solid phase of a hybrid rocket engine.

In hybrid rocket motors the regression rates of the solid fuel phase are normally low because of the dependence of the surface thermochemistry on heat transferred from the flame through the hybrid boundary layer by convection and conduction. Thus in the usual hybrid fuel, regardless of the oxidizer used, regression rates on the order of 0.03 inch per second at an oxidizer mass flux of 1.0 lb./sec.-in.$^2$ are the rule. Higher regression rates are desirable for many applications since the high mass discharge requirements of many hybrid motors require complex grain geometries when low regression rate fuels are used. One solution to the problem has been the incorporation of crystalline oxidizer such as ammonium perchlorate into the fuel. At effective levels, however, the oxidizer alters the thermochemistry of the fuel to the point where it will sustain combustion on its own. A major advantage of hybrid systems on-off capability is sacrificed for greater regression rates. It has been postulated that the production of heat at the fuel surface by chemical means should result in strong increases in regression rate. The present invention solves the problem of supplementing the surface energy of the solid phase of the hybrid system by incorporating therein discrete particles of a variety of compositions which undergo strong exothermic reactions.

The general purpose of this invention is to provide a solid fuel for a hybrid motor system which has an increased regression rate.

It is therefore an object of this invention to provide a solid fuel for use in hybrid rocket engines which increases the regression rate without sacrificing the on-off capacity.

Another object is to produce an improved fuel for solid rocket propellane systems.

It is also an object of this invention to provide a method for supplementing the surface energy of composite solid propellants used in the solid phase of a hybrid rocket engine.

Other objects, features and many of the attendant advantages of this invention will become readily appreciated as the same become better understood by reference to the following detailed description.

The invention is predicated on the discovery that by incorporating discrete particles of exothermic material into a solid propellant composition, which comprises the solid phase of a hybrid rocket engine, the regression rate was considerably increased. The exothermic particles were of a variety of reacting materials, the criterion being that the exothermic heat be largely released before the particle is ejected into the free hybrid gas stream.

Solid propellants are generally composed of a fuel, an inorganic oxidizer, such as sodium, potassium and ammonium perchlorate or nitrate, and a binder. The fuels employed are materials which can be oxidized sufficiently rapidly in the combustion chamber of a rocket engine to release gases to provide the desired thrust but are not violently explosive under prevailing conditions. Known fuels include asphalts, cellulose, rubbers and a large number of derivatives thereof and metals. Metals are commonly admixed to increase the flame temperature of the propellant and thereby increase the gas expansion rate. Particulate aluminum, magnesium, lithium, beryllium, boron and alloys thereof are among those used. Known binders include natural and synthetic resins, e.g., butadiene-styrene and butadiene acrylate rubbers, polyesters, phenol-formaldehyde resins, urea-formaldehyde resins, polyamids, polystyrenes, polysulfides, polyurethanes, and vinyl acetate resins.

Solid propellant compositions are cast into various geometrical shapes, or directly into the motor chamber, consistent with the rocket engine in which it is to be used.

The invention herein is for a novel solid fuel composition for use in the solid phase of a hybrid rocket engine. It employs a fuel-binder admixed with discrete particles of thermal compositions having heats of reaction in excess of 500 calories per gram. These compositions react exothermically giving the greatest heat release to the surface of the binder. Thus the need to depend on heat from the combustion process is decreased.

The following examples are illustrative of the practice of the invention, but are not to be construed as defining the limits thereof.

Example I

| Ingredients: | Percent by weight |
|---|---|
| Binder | 90 |
| Boron powder | 1.8 |
| Potassium nitrate | 8.2 |

The binder consisted essentially of a homogeneous mixture of about 66.67% by weight of a polyamide resin produced by the condensation of polycarboxylic acids with polyamines and sold under the tradename Versamid, and about 33.33% by weight of an epoxy resin sold under the tradename ERL 2795. The boron powder and potassium nitrate were blended and homogeneously dispersed throughout the binder. The composition was then cast and cured. When used as the solid fuel in a test hybrid rocket engine, the results showed increased regression rate. Discrete particles of the exothermic composition are sufficiently isolated in the matrix so that adjacent particles are not initiated by the reacting particles. Thus in operation, only heat transfer from the hybrid flame can provide sufficient energy to initiate the exothermic reactants.

Example II

The same ingredients were used as in Example I above, but the exothermic reactants, boron and potassium nitrate, were blended into granules and then dispersed throughout the binder. This composition gave better results. The granules, while themselves self-sustaining, were probably better isolated in the fuel-binder so that each granule or cell was initiated independently by the hybrid flame.

Better results are obtained from those compositions giving the greatest heat release to the surface of the binder. The following table gives several examples of thermite compositions which will serve as satisfactory exothermic materials when incorporated in about a 10 percent by weight ratio with a preselected fuel binder.

TABLE I.—THERMITE COMPOSITIONS

| Reactants | Products | Reactant Ratio | (Cal./g.) |
|---|---|---|---|
| $Mn/KMnO_4$ | $MnO_2/K_2O$ | 1/3.85 | 454 |
| $Mn/KMnO_4$ | $Mn_2O_3/K_2O$ | 1/2.08 | 619 |
| $Mn/KMnO_4$ | $Mn_3O_4/K_2O$ | 1/3.30 | 788 |
| $Al/Fe_2O_3$ | $Al_2O_3/Fe$ | 1/2.19 | 950 |
| $Al/Fe_3O_4$ | $Al_2O_3/Fe$ | 1/3.22 | 873 |
| $Mn/Sr(NO_3)_2$ | $MnO_2/SrO/N_2$ | 1/1.54 | 628 |
| $Mn/Sr(NO_3)_2$ | $Mn_2O_3/SrO/N_2$ | 1/1.16 | 747 |
| $Mn/Sr(NO_3)_2$ | $Mn_3O_4/SrO/N_2$ | 1/1.03 | 770 |
| $Mg/CF_2$ | $MgF_2/C$ | 1/2.06 | 2240 |
| $Mg/C_{11}H_8F_{14}$ | $MgF_2/C/HF$ | 1/5.57 | 1540 |

The method of increasing the regression rate through decreasing the effective heat of gasification by incorporating thermite compositions into the solid phase of a hybrid rocket engine proved to be a new approach to the problem of supplementing the heat transfer from the hybrid flame.

Obviously many modifications and variations of the present invention are possible in the light of the above teachings. It is therefore to be understood that within the scope of the appended claims the invention may be practiced otherwise than as specifically described.

What is claimed is:

1. A solid fuel composition having a high regression rate for a hybrid rocket engine comprising a mixture of a fuel-binder and discrete particles of a thermite composition;
   said fuel-binder being a member selected from the group the group consisting of butadiene-styrene, butadiene-acrylate rubber, polyesters, polyamids, polystyrenes, polysulfides, polyurethanes and vinyl acetate resins; and
   said composition being selected from the group consisting of the following reactants magnesium-potassium permanganate, aluminum-ferric oxide, aluminum-ferrous oxide, manganese-strontium nitrate, magnesium-polytetrafluoroethylene and boron-potassium nitrate.

2. A solid fuel having a high regression rate comprising the following

Ingredients: Percent by weight
  Binder _____ 90
  Boron _____ 1.8
  Potassium nitrate _____ 8.2 said binder consisting essentially of about 66.67 percent by weight polyamide and 33.33 percent by weight epoxy resin.

3. A solid fuel composition comprising a mixture of the following

Ingredients: Percent by weight
  Binder _____ 90
  Thermite composition _____ 10 said binder consisting essentially of 66.67 percent by weight polyamide and 33.33 percent by weight epoxy resin; and
said composition consisting essentially of one part manganese and 3.30 parts potassium permanganate.

4. A solid fuel composition comprising a mixture of the following

Ingredients: Percent by weight
  Binder _____ 90
  Thermite composition _____ 10 said binder consisting essentially of 66.67 percent by weight polyamide and 33.33 percent by weight epoxy resin; and
said composition consisting essentially of one part magnesium and 2.06 parts polytetrafluoroethylene.

5. A solid fuel composition comprising a mixture of the following

Ingredients: Percent by weight
  Binder _____ 90
  Thermite composition _____ 10 said binder consisting essentially of 66.67 percent by weight polyamide and 33.33 percent by weight epoxy resin; and
said composition consisting essentially of one part manganese and 1.03 parts strontium nitrate.

6. A solid fuel composition having a high regression rate comprising a mixture of about 90 percent by weight of
   a fuel-binder selected from the group consisting of butadiene-styrene, butadiene acrylate rubbers, polyesters, polyamides, polystyrenes, polysulfides, polyurethane and vinyl acetate resins; and
   about 10 percent by weight discrete particles of a thermite composition selected from the group consisting of the following reactants, magnesium-potassium permanganate, aluminum-ferric oxide, aluminum-ferrous oxide, manganese-strontium nitrate, magnesium-tetrafluoroethylene, and boron-potassium nitrate.

References Cited by the Examiner

UNITED STATES PATENTS

| 3,002,830 | 10/1961 | Barr _____ 149—43 X |
| 3,098,351 | 7/1963 | Higgins et al. _____ 149—42 X |
| 3,162,558 | 12/1964 | Bishop et al. _____ 149—19 X |
| 3,257,801 | 6/1966 | Matinez et al. _____ 149—22 X |

References Cited by the Applicant

UNITED STATES PATENTS

| 3,017,748 | 1/1962 | Burnside. |
| 3,083,527 | 4/1963 | Fox. |
| 3,130,096 | 4/1964 | Pruitt et al. |

CARL D. QUARFORTH, *Primary Examiner.*

L. DEWAYNE RUTLEDGE, *Examiner.*

S. J. LECHERT, Jr., *Assistant Examiner.*